United States Patent [19]

Rex

[11] 4,250,136
[45] Feb. 10, 1981

[54] METHOD OF FORMING A COMPOSITE STRUCTURE

[75] Inventor: Gary C. Rex, Troy, Mich.

[73] Assignee: Composite Technology Corporation, Troy, Mich.

[21] Appl. No.: 86,910

[22] Filed: Oct. 22, 1979

[51] Int. Cl.³ .......................... B29C 27/14; B32B 5/16; B32B 5/18; B32B 17/04

[52] U.S. Cl. .................................... 264/257; 264/321; 264/DIG. 6; 428/308; 428/311; 428/325; 428/327

[58] Field of Search ................. 264/321, 257, DIG. 6, 264/306, 308, 325, 327, 311, 310; 264/46.4, 101

[56] References Cited

U.S. PATENT DOCUMENTS

| | | | |
|---|---|---|---|
| 2,806,509 | 9/1957 | Bozzacco et al. | 428/308 X |
| 3,193,437 | 7/1965 | Schafer | 428/311 |
| 3,193,441 | 7/1965 | Schafer | 264/321 X |
| 3,707,434 | 12/1972 | Stayner | 428/308 |
| 3,867,221 | 2/1975 | Chant | 428/311 X |
| 3,989,781 | 11/1976 | Chant | 264/46.4 |
| 4,013,810 | 3/1977 | Long | 428/308 |
| 4,025,686 | 5/1977 | Zion | 428/327 X |
| 4,034,137 | 7/1977 | Hofer | 264/321 X |
| 4,042,746 | 8/1977 | Hofer | 428/311 |
| 4,178,406 | 12/1979 | Russell | 264/101 X |

*Primary Examiner*—Philip Anderson
*Attorney, Agent, or Firm*—Reising, Ethington, Barnard, Perry & Brooks

[57] ABSTRACT

The method of making a reinforced composite structure utilizing an initially amorphous foam core element containing a high volume of macro and micro spheres mixed in a thermosetting resin with said core element being contained between resin-impregnated, fibrous reinforcing layers such that the resin of the core element remains in the core element when the composite is molded under heat and pressure.

4 Claims, 2 Drawing Figures

METHOD OF FORMING A COMPOSITE STRUCTURE

TECHNICAL FIELD

The subject matter of the invention relates to the method of fabricating laminated composite structures of the type wherein a plurality of materials are joined together to provide an integral structure having the combined physical and chemical characteristics of the materials utilized. The invention is more specifically concerned with composites predominantly utilizing non-metallic materials such as high strength glass fibers, open-cell resin foams, thermosetting resin binders, and syntactic foam core elements comprised of small hollow spheres imbedded in a resin matrix.

In forming such composite structures and where relatively thick cross sections are required, rigid closed-cell foams previously have been utilized as core elements and upon which rigid elements resin-impregnated, open-cell and resilient foam layers have been compressed and cured.

The use of a rigid closed-cell core element comprised of a single resin phase in such a composite structure creates several problems related to the entrapment of gases which, in turn, limits (1) the ability to totally encapsulate the core element in a reinforced resin skin or outer casing and (2) resin curing temperature and, thus, the rate at which such composite structures may be formed.

Total encapsulation of a closed-cell core element in a hard and impervious casing is important in preventing the core element from being physically damaged or infiltrated in use by deleterious liquids and gases. Over a period of time such infiltration can either or both degrade the core element or cause a delamination of the outer casing from the core element.

The impervious outer casing of such composite structure includes an initially resilient and open-cell foam impregnated with a thermosetting resin and generally overlaid with a fiberglass reinforcing layer. In forming the composite structure the resin-impregnated foam layer and the reinforcing layer are compressed against the rigid core element and the resin cured by applying heat while maintaining the resilient foam layer in a compressed condition until the resin cures. The duration of the cycle for curing the resin is a combination of time and temperature. In general, the higher the curing temperature, the less the time required to cure the resin. At the same time, faster cure cycles are highly desirable in increasing utilization of mold equipment and, thus, in reducing manufacturing cost. However, in using a rigid closed-cell core element having a single resin phase, it is necessary to maintain resin curing temperatures below a certain level to prevent or to control the out-gassing of air or other gases normally trapped or contained within the closed cells of the rigid foam core element.

The out-gassing of entrapped air or other gases gives rise to two problems. First, unless great care is taken, including using relatively low resin curing temperatures, e.g. 150°-200° F., out-gassing can cause the protective outer layer to delaminate from the rigid open-cell core element, resulting in what is known as "pillowing". Secondly, total encapsulation of a single resin phase core element is impractical since a path for the escape of entrapped gases must be provided during the heat curing of the outer protective layer.

The present invention avoids the out-gassing and other difficulties heretofore associated with the use of conventional rigid, closed-cell, foam core elements by utilizing an initially amorphous or deformable syntactic foam core element comprising hollow spheres, made either of organic or inorganic materials, imbedded in a thermosetting resin. In their smallest sizes such spheres are referred to as microspheres or micro-balloons.

It is also known to form reinforced composite structures utilizing either initially rigid or flowable syntactic foam core elements. While the use of an initially rigid syntactic foam core element in combination with a reinforced outer layer provides an excellent composite structure, the ultimate cross sectional shape of the structure is determined by pre-forming the rigid core element. Such a composite structure is shown in copending application U.S. Ser. No. 012,175 "Composite Structure" filed Feb. 14, 1979 and also assigned to the assignee of the present application.

Particularly with parts having highly contoured cross sections, it is desirable to eliminate precontouring a rigid core element and to instead utilize an amorphous or shapable syntactic core element. However, in order to maintain a syntactic core element having substantially equal density and strength throughout its cross section, it is important that the resin encapsulating the hollow spheres not flow out of the core element during the composite molding operation.

Applicant's invention relates to a method of forming a reinforced composite structure utilizing an initially amorphous or shapable syntactic foam core element wherein the encapsulating resin remains within the core element and does not flow into the outer reinforcing layers.

BACKGROUND ART

Schafer U.S. Pat. Nos. 3,193,437 and 3,193,441, as well as Chant 3,867,221, illustrate the concept of an initially resilient and open-cell foam material impregnated with a thermosetting resin, used alone or in combination with reinforcing fibers, and wherein the foam layer is compressed under relatively low pressures such that the thermosetting resin substantially fills the cells of the foam and which resin is cured while maintaining the resilient foam layer in a compressed condition. The Chant and Schafer processes are particularly advantageous in constructing a relatively thin walled composite member of high strength and density. At the same time it is possible to utilize these processes to build up composite parts of considerable thickness. However, since in either of these processes it is necessary to compress the originally resilient open-cell foam material to between ½ and ¼ of its original thickness in order to fill the open cells with resin, it is necessary to use either a very thick, initially resilient, open-cell foam material or several layers of such material, all impregnated with a thermosetting resin, in order to achieve a relatively thick part. The disadvantages of using such process alone to produce a part of thick cross section is that such part (1) becomes heavy relative to its strength and rigidity, (2) is costly due to the essentially solid resin matrix which extends throughout the part and (3) is a poor insulator as indicated by a low K factor.

While theoretically possible to make composite parts of relatively unlimited thickness using the molding process taught by Chant or Schafer, in practice parts with thicknesses beyond 7 to 8 mm (0.315 inch) lose certain of their important advantages including an important reduction in the strength-to-weight ratio as thickness increases.

The concept of a composite structure comprising a rigidified, closed-cell core element having a reinforced resin outer surface or casing is shown in U.S. Pat. No. 4,042,746 Hofer. In practice it is found in making a composite structure of the type taught in Hofer, the curing temperature for the resin which impregnates the resilient open-cell foam outer layer must be held in the range of 150°–200° F. in order to control the out-gassing of the air or gases trapped in the closed-cell element. Likewise, one or more of the side walls of the rigid core element are left unencapsulated to provide an exit path for any gases released or generated during the molding operation.

While satisfactory composite structures can be made in accordance with the teaching of the Hofer patent, the rate at which such parts can be made is limited by the relatively low resin curing temperatures which must be employed.

The use of small glass beads or spheres as an additive to a thermosetting resin used in a composite structure is shown in a companion U.S. Pat. No. 4,034,137 Hofer. In this Hofer patent the glass beads and fiberglass fibrils are added to a liquid resin which impregnates plural layers of open-cell, resilient foam for the purpose of decreasing the resin density and for increasing the bond strength between adjacent foam layers. U.S. Pat. No. 4,034,137 is concerned with enhancing laminar bond strength in relatively thin wall structures and does not relate to a closed-cell and relatively thick core element comprised of small hollow spheres imbedded in an organic resin which is in turn totally encased or encapsulated in a reinforced resin outer layer.

The method of making a reinforced composite structure utilizing a formable syntactic core element is shown in U.S. Pat. No. 4,025,686 Zion. In Zion a portion of the liquid resin of his uncured syntactic foam is forced through his reinforcing material to the exterior surface of his article. Zion also teaches that while his uncured resin flows outwardly, the microspheres are too large to pass through the reinforcing material and thus remain in the core of the article. Several problems result from the method taught by Zion. First, as Zion's resin flows out of his uncured syntactic foam core element to provide a resin-rich outer surface, the proportion of resin to microspheres is reduced and, in turn, reduces the strength of the cured core portion of his composite. In other words, the less resin in the core element in proportion to microspheres, the weaker the core element portion of the composite and the greater the likelihood of delamination or other structural failure through the core element.

Next, in flowing outwardly during molding, Zion's uncured resin will likewise cause his microspheres to flow outwardly toward and to concentrate against his fibrous reinforcing material. Since his microspheres cannot pass through his reinforcing layer, said layer acts as a sieve having a high concentration of microspheres at the interface of the core element and the reinforcing layer. Such high concentration of microspheres inevitably decreases the laminar strength of the resultant composite along such interface.

On the other hand, Applicant's method, while providing an initially amorphous or formable core element, combines such core with super-adjacent, resin-impregnated, compressible and reinforced outer layers to prevent the flow of resin out of the core element and to maintain a substantially uniform distribution of hollow spheres and resin throughout the core of the composite structure.

DISCLOSURE OF THE INVENTION

In accordance with the present invention it is possible to mold a relatively lightweight, high strength composite structure of considerable thickness wherein the possibility of delamination is greatly reduced both by eliminating or substantially reducing the possibility of outgassing and by maintaining substantially uniform density throughout the moldable syntactic foam core element of the composite.

The improved composite structure of this invention derives from the use of an initially amorphous and formable syntactic foam core element comprised of hollow spheres imbedded in an organic resin binder in combination with an initially open-cell, resilient foam layer impregnated with a liquid thermosetting resin and which foam layer is compressed against the amorphous core element with the thermosetting resins in the opencell outer layer and the amorphous core element being cured simultaneously while maintaining the resin-impregnated foam layer in a compressed condition. Furthermore, the present invention insures a substantially uniform distribution of resin and hollow spheres in the core portion of the resultant composite thereby reducing the likelihood of composite delamination or other structural failure.

The amorphous or uncured core element of the present invention is comprised of a mixture of small and large organic (e.g. polystyrene or phenolic) or inorganic (e.g. clay, quartz, or glass) hollow spheres having diameters, for example, in the range of 10 to 15,000 microns and wall thicknesses of 0.2 to 200 microns, and which micro and macro spheres are substantially uniformly distributed throughout an uncured organic resin matrix. The spheres present in the rigid core elements constitute 60% to 80% by volume with the resin being 40% to 20% by volume or being from about 20 to 50 parts by weight for each 100 parts of resin. The resin may be of any suitable organic type such as epoxy, polyester, or vinylester. The uncured core element as described is a syntactic foam having an amorphous or formable continuous resin phase containing a discontinuous rigid phase of hollow spheres.

The amorphous or formable core element or material consists of a thermosetting resin having suitable hollow spheres substantially uniformly distributed therethrough. The core material is mixed to a dough-like consistency so that while formable under heat and pressure, it will not flow readily under its own weight as the composite materials are brought together prior to molding.

In the preferred form of the invention a sandwich of composite materials is assembled and placed within a mold having the shape of the article to be formed. The sandwich may be assembled outside or within the mold as desired. The composite sandwich is comprised of the following ingredients: (1) a first or bottom layer of reinforcing material such as fiberglass in woven or mat form; (2) a first layer of initially resilient and open-cell foam containing a liquid thermosetting resin such as epoxy, polyester, vinylester, or the like, is laid over the first reinforcing layer; (3) a second layer of reinforcing material is laid over the first resin-containing, open-cell foam layer; (4) a suitable quantity of uncured syntactic foam having a dough-like consistency is placed over the second reinforcing layer; (5) a third reinforcing layer is placed over the uncured and amorphous syntactic foam; (6) a second layer of liquid, resin-containing, open-cell, resilient foam is overlaid on the third reinforcing layer; and (7) a fourth or upper layer of reinforcing material is laid upon the second resin-containing foam layer. The composite sandwich is then placed within the mold and subjected to suitable heat and pressure to cause the uncured sandwich to assume the internal shape of the mold. While the amorphous core element assumes the shape of the mold under pressure, the dough-like consistency of the core element makes it more resistant to deformation than are the super-adjacent, resin-containing, open-cell foam layers. Accordingly, the mold pressure causes the bottom and upper resin-containing foam layers to be compressed against the amorphous core and to be reduced to between one-half to one-quarter of their original thickness whereby the open cells are filled with the liquid resin and the adjacent reinforcing layers encapsulated with the excess liquid resin from the resilient foam layers. While maintaining the sandwich under heat and pressure, the liquid resin in the resilient foam layers and the resin of the amorphous core element are cured to provide a rigid composite structure comprising a hardened, reinforced, outer casing surrounding a hardened syntactic foam core having a substantially uniform distribution of resin and hollow spheres.

The details of the invention are set forth in the drawings and the description which follows.

BEST MODE FOR CARRYING OUT THE INVENTION

Figure 1:
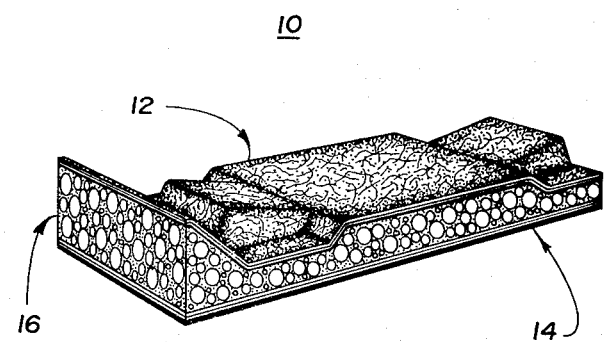
FIG. 1 is a sectional view through a composite structure made in accordance with the invention.

A rigid composite structure formed in accordance with the method of the present invention is shown generally at 10 in FIG. 1. Structure 10 includes thin, hardened, outer casings 12 and 14 which encase a relatively thick and rigidified syntactic foam core element 16. The cross sectional shape of composite structure 10 is determined by the internal configuration of a suitable mold (not shown).

Figure 2:
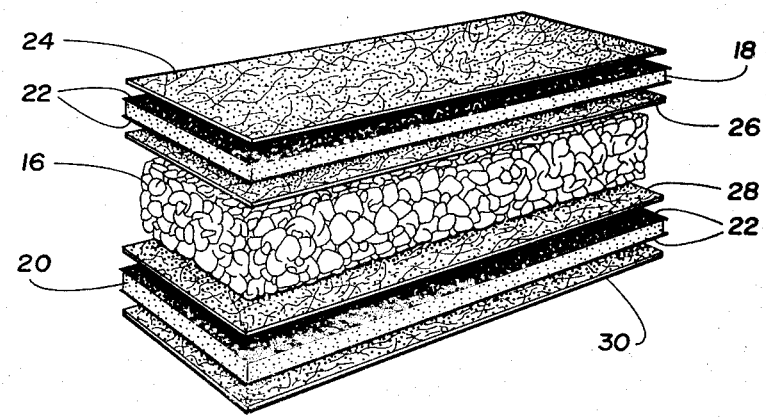
FIG. 2 is an exploded view showing the elements forming a composite sandwich prior to molding.

FIG. 2 represents an exploded perspective view of the composite sandwich elements prior to molding and curing. Prior to molding the hardened outer casings 12 and 14, respectively, include open-cell, resilient foam layers 18 and 20.

In referring to the open-cell character of each resilient foam layer is meant that in general 85% of the foam cells are in open communication with adjacent cells. It has been found that a flexible or resilient polyurethane foam is highly satisfactory for practice with the subject invention. However, other open-cell, resilient foams may be used so long as they are compatible with the thermosetting resin with which such foam is to be impregnated.

Open-cell foam layers 18 and 20 may be considered to be reservoirs for retaining a liquid thermosetting resin during the molding process. It is normal to use an open-cell foam layer of one inch or less of initial or uncompressed thickness and having a density in the range of 0.5 to 5 pounds per cubic foot.

The open-cell layers 18 and 20 initially are either coated or impregnated with a suitable thermosetting resin 22 prior to being placed upon core element 16. The resilient foam layers may thus be coated or impregnated in any well-known fashion such as dipping, being run through a resin bath and thereafter passed between squeezing rolls to control the amount of liquid resin retained within the foam layer; gravure roll coated; or spreading resin over either or both sides thereof.

Again depending upon compatibility with the other composite materials, available cure time, physical strength requirements in the reinforcing outer layer, and cost, a variety of satisfactory liquid thermosetting resin systems 22 may be used to coat or impregnate the open-cell foam layers 18 and 20. As an example, it is highly satisfactory with the present invention to utilize vinylester, polyester, or epoxy resins for coating or impregnating purposes.

Reinforcing layers 24–26 and 28–30 are adapted to respectively overlay the liquid resin-containing, open-cell foam layers 18 and 20 as indicated in FIG. 2. A preferred reinforcing layer is comprised of glass fibers in mat or woven cloth form. Depending in part on the ultimate exterior surface appearance desired, other reinforcing materials may be utilized either in combination with high strength glass fibers or instead thereof.

Hardened outer casing 12 of FIG 1 is comprised of reinforcing layers 24–26, intermediate resilient foam layer 18 and a continuous resin phase formed by resin 22. The other hardened casing 14 is comprised of reinforcing layers 28–30, intermediate resilient foam layer 20 and a continuous resin phase formed by resin 22.

Prior to molding, syntactic foam core element 16 is amorphous or moldable in form as portrayed in FIG. 2.

Core element 16 is comprised of a first continuous resin phase 32 or matrix within which hollow spheres 34 are entrapped or encapsulated to provide a second and discontinuous rigid phase.

The continuous resin phase 32 may be any suitable polymerizable resin such as epoxy, polyester, vinylester, or the like. One factor in the selection of the continuous phase resin is its chemical compatibility with the material of the hollow spheres.

The hollow spheres 34 may be either organic or inorganic materials. Typical organic materials are made from phenolic, urea-formaldehyde or polystyrene resins. Inorganic sphere materials, which are generally preferred, are usually based on sodium silicate or glass. In smaller sizes of 10 to 200 microns or smaller, the hollow spheres or beads are sometimes referred to as micro-spheres or micro-balloons. Such spheres can have wall thicknesses of from 0.5 to 2.0 microns. The larger spheres, known as macro-spheres or macro-balloons, have a diametral range of between 500 and 15,000 microns with appropriately thicker wall sizes in the range of 100 to 200 microns.

The spheres 34 are considered fillers for the continuous resin phase and are used primarily to reduce density and thus lighten the cured continuous resin phase. The number of spheres mixed with the uncured continuous phase resin is generally referred to as the loading volume. Referring to the present invention, the greater the loading volume or number of spheres, the less the density of the core element. While density decreases with increased loading volumes, it is also to be noted that the tensile strength of the filled resin material or core element also decreases as the total sphere volume increases. Similarly, the viscosity of the mixture of uncured or liquid resin and spheres increases with higher sphere loading volumes. Thus, with low loading volumes the liquid resin and sphere mixture will have a low viscosity and thus is easily pourable. At the other extreme of high loading volumes, the spheres may have to be tamped into the liquid resin. The latter or high volume loading is preferred in order to achieve the aforementioned dough-like consistency which, while being moldable, provides a resistence against which the resin-containing foam layers 18 and 20 may be compressed.

It is also to be understood that spheres of differing sizes are normally mixed with the liquid resin to increase the loading volume and to thereby reduce core element density. In other words, if one were to fill a volume with macro-spheres alone, the loading factor could be in the range of 50%-60%. On the other hand, by adding microspheres which tend to fill the interstices between the macro-spheres, the loading factor can be raised to the 80% range thereby enhancing the lightness of the core element.

While the spheres normally contain trapped air or gases, these gases being encased in generally rigid spheres present no out-gassing problem during the subsequent molding and curing of the protective casing about the core element. However, removal of air or other gases trapped in the liquid resin phase may be desirable and, if desired, can be achieved by vibrating the liquid resin-sphere mixture in a thin film and passing a blast of hot air over the surface to break the resin-entrapped gas bubbles.

It is desirable to maximize the sphere loading volume to reduce the core element density and to increase viscosity while still maintaining formability. One limitation on such sphere loading volume is the need to assure the wetting of the spheres by the liquid resin phase. In other words, it is undesirable to have a significant quantity of unwetted spheres in the core element.

In making composite structures in accordance with the present invention, it is desirable to provide a rigid core element wherein the hollow spheres comprise 20 to 50 parts by weight for every 100 parts by weight of the continuous resin phase.

To maximize the hollow sphere loading of the continuous resin phase 32 to reduce the weight of the core element 16, it is preferred to utilize a mixture of varying sized spheres. A typical mixture of such spheres would be as follows:
Macro: 500 to 15,000 microns
Micro: 20 to 300 microns
Further, it is preferred that the macro-spheres to microspheres be in the volume ratio of about 3 or 4 to 1.

It is most important to the molding of composite structures in accordance with the method of the subject invention that there be a substantially uniform distribution of the hollow spheres throughout the continuous resin phase of both the amorphous or uncured as well as the ultimately rigid or cured syntactic foam core element. Such uniform sphere distribution within the continuous resin phase insures the uniformity of strength throughout the core element. In other words, should there be areas within the core element with substantially less resin as compared to other areas, the core element area having less resin will be weaker, therefore more subject to delamination or other structural failure than will be the case with areas containing more resin. Thus, in the subject method the amorphous or uncured core element is mixed until there is a substantially homogeneous mixture of large and small hollow spheres and uncured resin. It is thereafter necessary that the uncured resin in the core element not flow out of the core element during the molding operation lest such loss of resin relative to hollow spheres cause a structural weakening of the core element. U.S. Pat. No. 4,025,686 Zion exemplifies such an undesirable result by teaching the flow of resin out of a syntactic foam core to form a composite structure having a resin-rich outer skin. While a resin-rich skin may be desirable, it should not be achieved at the expense of a resin-depleted core element which then becomes a structurally weakened section of the composite.

In the subject method, overlaying both sides of the amorphous core element with resin-containing, resilient and open-cell foam layers provides an independent source of resin for the reinforced outer skin and also blocks the flow of resin out of the amorphous core element. To verify that the liquid resin in the outer reinforcing layers does not flow inwardly past the interface with the core element nor does the resin in the core element flow outwardly past said interface, the respective resins may be pigmented with contrasting colors. A cross section through such a molded composite structure will reveal that the contrastingly pigmented resins stop at the interface between the outer layers or skin and the core element, establishing that the core element is not deprived of resin during the molding operation.

While numerous compatible combinations are possible within the scope of the present invention, the following is an example of materials which may be combined to provide a high-strength, lightweight composite structure.
1. Core element
    a. epoxy resin 100 parts by weight
    b. curing agent
    c. wetting agent.
    d. a mixture of glass hollow spheres comprising 20 to 50 parts by weight and having macro-spheres in the diameter range of 500 to 15,000 microns and microspheres in the diameter range of 10 to 300 microns and with the volume ratio of macro to micro spheres being about 3 or 4 to 1
  The core element being formed 1 to 4 inches in thickness and having a density of 20-30 lbs. per cubic foot.
2. Reservoir foam layer
    open-cell, resilient, polyurethane foam ½ inch thick having a density of 1.2 lbs. per cubic foot.
3. Reinforcing layer
    fiberglass mat with chopped or continuous fibers having a weight of 1 ounce per square foot.
4. Thermosetting resin
    epoxy resin system based on 828 (Shell) resin with an adducted diethylene-triamine plus fillers and extenders as desired.

The preferred method of forming a composite structure in accordance with the present invention includes the following steps:
  1. filling the liquid thermosetting resin of the core element with a sufficient volume of a mixture of large and small hollow spheres until the core element has a dough-like consistency and blending the resin/spheres mixture to achieve a relatively homogeneous distribution of spheres throughout the resin;
  2. forming a sandwich having
    a. a first fibrous reinforcing layer,
    b. a first, initially resilient, open-cell foam layer containing a liquid thermosetting resin and overlaying said first reinforcing layer, c. a second fibrous reinforcing layer overlaying said first open-cell foam layer,
d. overlaying the uncured core element upon the second reinforcing layer,
e. overlaying the core element with a third fibrous reinforcing layer,
f. overlaying the third fibrous layer with a second initially resilient, open-cell foam layer containing a liquid thermosetting resin,
g. overlaying said second foam layer with a fourth fibrous reinforcing layer;
3. placing said sandwich within an internally contoured mold;
4. closing said mold to subject said sandwich to a pressure sufficient to
  a. cause the sandwich to assume the internal shape of said mold, and
  b. compress said open-cell foam layers to between ¼ and ½ their original thicknesses whereby the contained resins fill substantially all the open cells and encapsulate the adjacent fibrous reinforcing layers;
5. while maintaining the sandwich under pressure within the mold, applying sufficient heat, e.g. 300° F., to cure the resins to provide a rigid composite structure.

In order to maximize the lightness of the core element 16, it is preferred that the volume of hollow spheres to resin, i.e. "packing volume", be in the 60-90% range. At the higher packing volumes it is possible to achieve composite densities of 15 pounds per cubic foot.

With respect to the subject invention, it is to be noted that the resins 22 contained in the core element 16 and the open-cell foam layers 18 and 20 may be the same or of different though compatible types. In other words, for purposes of the present invention, epoxy, polyester, vinylester, and the like may be variously utilized in the various layers of the composite.

It is also to be noted that certain of the fibrous reinforcing layers may be eliminated in the construction of the composite sandwich. For example, the second and third fibrous layers 26 and 28 could be eliminated.

Other modifications are possible within the intended scope of the invention as set forth in the hereinafter appended claims.

What is claimed is:

1. The method of forming a composite structure including the steps:
A. forming a composite sandwich having:
  (1) an amorphous syntactic foam core element comprising a first uncured thermosetting mixture of hollow spheres constituting 60% to 90% by volume of said element,
  (2) overlaying said syntactic foam core element with enclosing layers each comprising a resilient open-cell foam containing a second uncured thermosetting resin and a fibrous reinforcing layer;
B. placing said composite sandwich within a mold;
C. actuating said mold to compress said composite sandwich with sufficient pressure to cause
  (1) said composite sandwich to assume the internal shape of said mold,
  (2) said open-cell foam layers to be substantially reduced in thickness whereby the open cells are substantially filled and the fibrous reinforcing layers encapsulated with the second thermosetting resin, and
  (3) the second uncured resin contained in the open-cell foam to block the flow of the first uncured resin out of the amorphous core element;
D. while maintaining said composite sandwich under pressure, applying sufficient heat to said mold to cure said thermosetting resins and thereby provide a rigid composite structure.

2. The method as set forth in claim 1 wherein the amorphous core element contains micro-spheres having diameters in the range of 10 to 300 microns, macro-spheres having diameters in the range of 500 to 15,000 microns, and with the volume ratio of macro to micro spheres being in the range of 3/1 to 4/1.

3. The method of forming a composite structure including the steps:
A. laying up a composite sandwich comprising:
  (1) a first bottom layer of fibrous reinforcing material,
  (2) a first layer of resilient, open-cell foam containing an uncured thermosetting resin and overlaying said first fibrous layer,
  (3) a second layer of fibrous reinforcing material overlaying the first resin-impregnated foam layer,
  (4) an amorphous syntactic foam layer overlaying said second fibrous layer, said syntactic foam layer comprising an uncured thermosetting resin containing hollow spheres in the amount of 20% to 50% of the weight of said foam layer,
  (5) a third layer of fibrous reinforcing material overlaying said syntactic foam layer,
  (6) a second layer of resilient, open-cell foam containing an uncured thermosetting resin and overlaying said third fibrous layer,
  (7) a fourth upper layer of fibrous reinforcing material overlaying said second resin-impregnated foam layer;
B. placing said composite sandwich within a mold;
C. actuating said mold to compress said composite sandwich with sufficient pressure to cause
  (1) said composite sandwich to assume the internal shape of said mold, and
  (2) said first and second resin-impregnated foam layers to be reduced to between one-half to one-quarter their original thickness whereby their open cells are substantially filled and their respective overlaying fibrous reinforcing layers are encapsulated with said thermosetting resins;
D. while maintaining said sandwich under pressure, applying sufficient heat to said mold to cure said thermosetting resins and provide a rigid composite structure.

4. The method as set forth in claim 3 wherein the amorphous core element contains micro and macro spheres respectively having diameters in the range of 10 to 300 microns and 500 to 15,000 microns and with the volume ratio of macro to micro spheres being in the range of 3/1 to 4/1.

* * * * *

UNITED STATES PATENT AND TRADEMARK OFFICE
CERTIFICATE OF CORRECTION

PATENT NO. : 4,250,136
DATED : February 10, 1981
INVENTOR(S) : Gary C. Rex

It is certified that error appears in the above—identified patent and that said Letters Patent is hereby corrected as shown below:

Column 7, line 47, "20" should read -- 10 --.

Signed and Sealed this

Seventh Day of July 1981

[SEAL]

*Attest:*

RENE D. TEGTMEYER

*Attesting Officer*     *Acting Commissioner of Patents and Trademarks*